United States Patent
Metzler et al.

(10) Patent No.: US 9,731,257 B2
(45) Date of Patent: Aug. 15, 2017

(54) DEVICE FOR PRODUCING A MULTICOMPONENT MIXTURE

(71) Applicant: SONDERHOFF ENGINEERING GMBH, Hörbranz (AT)

(72) Inventors: Mario Metzler, Lustenau (AT); Christian Schwabl, Bregenz (AT)

(73) Assignee: Sonderhoff Engineering GmbH, Hörbranz (AT)

( * ) Notice: Subject to any disclaimer, the term of this patent is extended or adjusted under 35 U.S.C. 154(b) by 485 days.

(21) Appl. No.: 14/398,075

(22) PCT Filed: Apr. 12, 2013

(86) PCT No.: PCT/IB2013/052931
§ 371 (c)(1),
(2) Date: Oct. 30, 2014

(87) PCT Pub. No.: WO2013/164719
PCT Pub. Date: Nov. 7, 2013

(65) Prior Publication Data
US 2015/0109878 A1   Apr. 23, 2015

(30) Foreign Application Priority Data
May 3, 2012   (DE) .......................... 10 2012 103 885

(51) Int. Cl.
| | |
|---|---|
| *B28B 7/40* | (2006.01) |
| *B01F 15/00* | (2006.01) |
| *B29B 7/40* | (2006.01) |
| *B29B 7/76* | (2006.01) |
| *B29B 7/80* | (2006.01) |
| *B29B 7/82* | (2006.01) |

(52) U.S. Cl.
CPC .. *B01F 15/00025* (2013.01); *B01F 15/00396* (2013.01); *B29B 7/404* (2013.01); *B29B 7/407* (2013.01); *B29B 7/7605* (2013.01); *B29B 7/7652* (2013.01); *B29B 7/805* (2013.01); *B29B 7/82* (2013.01)

(58) Field of Classification Search
CPC ...................................................... B29B 7/404
USPC ................................................. 366/138, 149
See application file for complete search history.

(56) References Cited

U.S. PATENT DOCUMENTS

| | | | |
|---|---|---|---|
| 3,026,183 A | | 3/1962 | Cole |
| 3,141,865 A | * | 7/1964 | McEvoy ................. B29B 7/408 264/54 |
| 3,207,486 A | * | 9/1965 | Rosenthal ............... B29B 7/404 134/98.1 |

(Continued)

FOREIGN PATENT DOCUMENTS

| | | |
|---|---|---|
| DE | 2530018 A1 | 1/1977 |
| EP | 0649717 A1 | 4/1995 |

(Continued)

*Primary Examiner* — David Sorkin
(74) *Attorney, Agent, or Firm* — Rankin, Hill & Clark LLP

(57) ABSTRACT

A device for producing a multicomponent mixture having a mixing chamber which is surrounded by a chamber wall, the device further includes an outlet for a multicomponent mixture and into which at least two component valves and at least one flushing valve open, the flushing valve being in connection on the inlet side with a temperature control channel system which is associated with the chamber wall and through which water can flow.

20 Claims, 5 Drawing Sheets

(56) References Cited

U.S. PATENT DOCUMENTS

| | | | |
|---|---|---|---|
| 3,362,919 A | | 1/1968 | Rood |
| 3,769,232 A | * | 10/1973 | Houldridge ........... B29B 7/7433 264/54 |
| 3,902,850 A | | 9/1975 | Lehnert |

FOREIGN PATENT DOCUMENTS

| | | |
|---|---|---|
| EP | 0723843 A2 | 7/1996 |
| EP | 1375008 A2 | 1/2004 |
| EP | 1992465 A2 | 11/2008 |

* cited by examiner

DEVICE FOR PRODUCING A MULTICOMPONENT MIXTURE

The invention relates to a device for producing a multicomponent mixture, comprising a mixing chamber which is surrounded by a chamber wall, has an outlet for the multicomponent mixture and into which at least two component valves and at least one flushing valve open.

BACKGROUND OF THE INVENTION

Devices for producing a multicomponent mixture are known for example from EP 649 717 and serves for mixing at least two components of a polymer mixture with one another in order thereby to produce a reactive polymer mixture, which is then discharged by way of the outlet of the mixing chamber. Patent No. EP 649 717, and any translation thereof, is hereby incorporated by reference into this application for showing the same. Such multicomponent polymer mixtures may be, for example, reactive adhesives, sealing materials, potting compounds or the like, it being possible for the mixing of the components in the mixing chamber to take place by static baffles provided therein, but it being preferred for a mechanically driven stirrer to be provided in the mixing chamber, intimately mixing the polymer components injected into the mixing chamber by way of the component valves.

In order to allow the mixing chamber to be cleaned as and when required, the generically determinative prior art proposes high-pressure water flushing of the mixing chamber, for which purpose flushing water under high pressure is injected as and when required into the mixing chamber by way of the flushing valve, the water that impinges at high speed on the wall of the mixing chamber and the stirring element of the mechanical stirrer that is accommodated therein freeing these components of the residues of the multicomponent mixture that become deposited on them. The flushing water contaminated with these residues leaves the mixing chamber again by way of the outlet and is separated from the contaminants in a downstream cleaning process before it is either recycled or discharged into the drainage system.

In order to be able to have a specific influence on the reaction behavior of the multicomponent mixture or the components thereof, it has been proposed to provide a possible way of controlling the temperature, whereby cooling in particular and, if and when required, possibly also heating of the mixing chamber is possible. A major problem here is the requirement for a device that is as compact as possible, since the mixing head having the mixing chamber must often be moved in relation to a component under conditions of confined space, in order for example to form a seal on this component by the FiPFG method (formed in place formed gasket). There are proposals to control the temperature of devices of the type concerned here by cooling sleeves or the like that are placed on the outside of the wall of the mixing chamber. However, these proposals have not proven to be very effective; in particular, with the proposals made so far it is difficult to achieve control of the temperature of the mixing chamber that is as uniform as possible even in the region of the flushing valve or valves.

SUMMARY OF THE INVENTION

The invention of this application relates to devices for producing a multicomponent mixture. An object of the invention is to develop a device of the type mentioned at the beginning to the extent that both temperature control and flushing of the mixing chamber with water are possible with a structural form of the device that is particularly compact.

This object and others are achieved by the invention in that the flushing valve is in connection on the inlet side with a temperature control channel system which is associated with the chamber wall and through which water can flow.

The invention has the particular advantage that not only does a temperature control channel system that is associated with the chamber wall, and is preferably formed in the chamber wall itself, serve for cooling (or possibly heating) the mixture located in the mixing chamber, but at the same time the flushing water required for the flushing/cleaning of the mixing chamber also passes by way of the same channel system to the flushing valve and, when the latter is actuated, can be injected through it into the mixing chamber. This dual use of the system of lines, both for controlling the temperature of the mixing chamber and for supplying flushing fluid to the flushing valve, not only allows a particularly compact structural form of the device, but also makes it possible to achieve a very uniform temperature control of the mixing chamber even in the region of the flushing valves, since the (cooling) fluid flowing through the temperature control channel system also in fact acts on the flushing valve and sets it or the surrounding region of the chamber wall to the desired temperature.

In order to allow the flushing of the mixing chamber and the components accommodated therein, in particular the stirrer active therein, to be brought about under high pressure in the way that is preferably aimed for, it is preferably provided that the temperature control channel system has a high-pressure water connection. The temperature control channel system preferably has at least one inflow connection and at least one outflow connection for cooling or heating water, it being possible for the arrangement to be set up in such a way that the inflow connection, or in particular the outflow connection, is formed by the high-pressure water connection. In this case, the cooling or heating water can flow in the temperature control channel system under the high pressure of the flushing fluid that is intended for the cleaning of the mixing chamber and cleaning of the mixing chamber is possible in practice at any point in time by simply opening the flushing valve. However, for energy-related reasons, such an arrangement is usually only appropriate if the mixing chamber has to be flushed very frequently, that is to say at short time intervals. In most cases, it is preferred if the inflow connection or the outflow connection can be separated from the high-pressure water connection by means of at least one check valve or shut-off valve or possibly also a number of check valves or shut-off valves. In this case, the fluid flowing through the temperature control channel system for controlling the temperature of the mixing chamber is pumped, for example by means of a circulating pump, with low positive pressure, which merely has to be great enough to compensate for the pressure losses occurring during circulation. The high fluid pressure desired for backflushing is then only built up as and when required directly before a flushing operation, the components of the cooling circuit that are intended for the circulation of the cooling or heating fluid and further components located in the cooling circuit, in particular outside the actual mixing device, not being subjected to the high flushing pressure on account of the check valve or shut-off valve that is provided.

Needle valves, which can preferably be actuated by means of compressed air, have proven successful as flushing valves. For controlling the temperature of the mixing chamber as uniformly as possible, it has proven advantageous if the temperature control channel system has a number of channel portions which are arranged in the chamber wall such that they are distributed over the circumference of the mixing chamber, pass through the wall from the top downward or from the bottom upward and through which the temperature control fluid flows, preferably alternately from the top downward and from the bottom upward. For this, the arrangement may then be set up in such a way that the chamber wall has an end face covered by means of a covering, there being formed in the end face or the covering one or more water channels which extend over the circumference or over portions of the circumference of the mixing chamber and from which water bores in the wall branch off. In this case, the water bores may, for example, run in the chamber wall at a preferably obtuse angle in relation to the end face, every two or more water bores being in connection with one another at their end that is remote from the end face. In terms of the structural design, it is also advantageous if the water bores open with their ends that are remote from the end face into one or more prechambers and if at least one prechamber acts on the inlet side on at least one flushing valve.

As already indicated above, it is generally advantageous that the water flowing through the temperature control channel system circulates in a circuit and that the circuit has a storage tank, a heating or cooling device and a circulating pump for the water, it being preferred in this configuration if one or more switchable shut-off valves and/or one or more check valves is/are arranged in the circuit, whereby the components arranged in the cooling circuit—with the exception of the water channels surrounding the mixing chamber, in particular formed in the chamber wall—can be shut off from the high-pressure connection, so that the high water pressure occurring during backflushing does not act on the components of the cooling or heating circuit.

These and other objects, aspects, features, advantages and developments of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DESCRIPTION OF PREFERRED EMBODIMENTS

Figure 1:
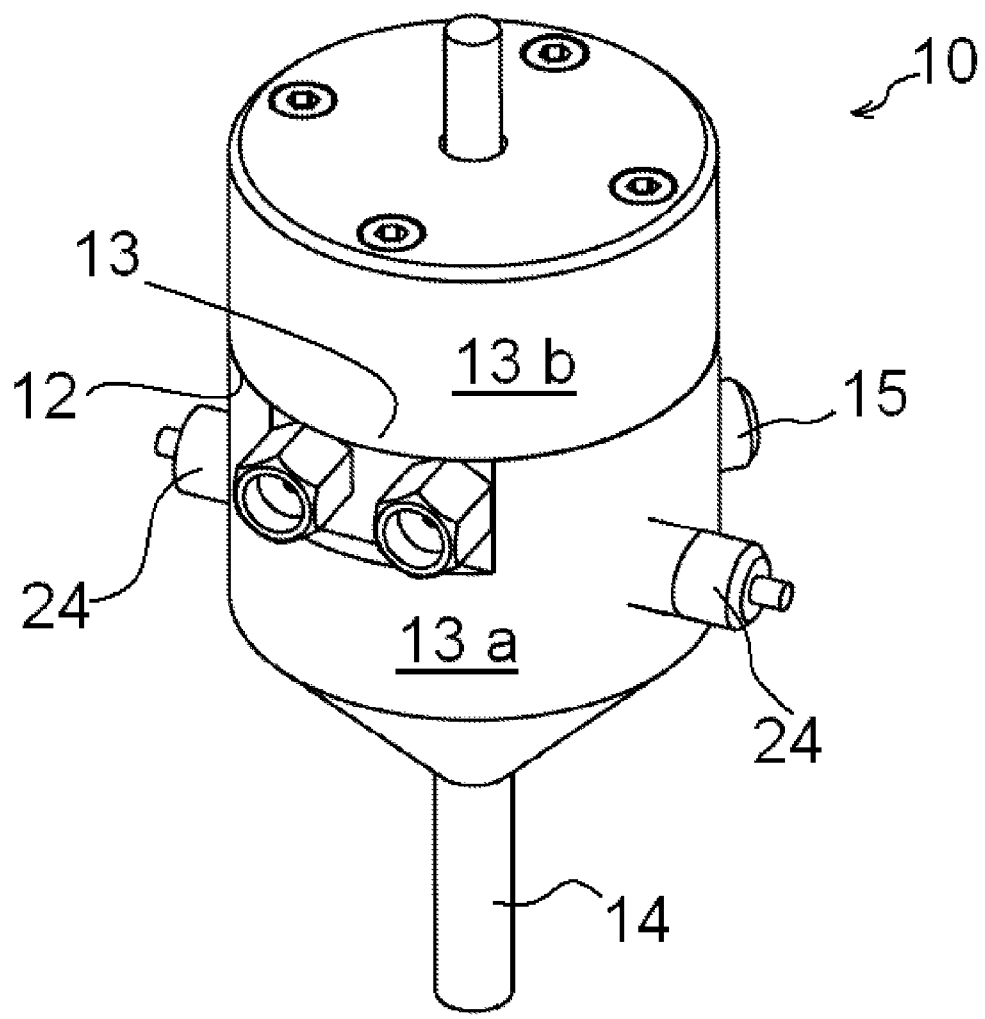
FIG. 1 shows a mixing device according to the invention for producing a multicomponent mixture in a perspective representation.
Figure 2:
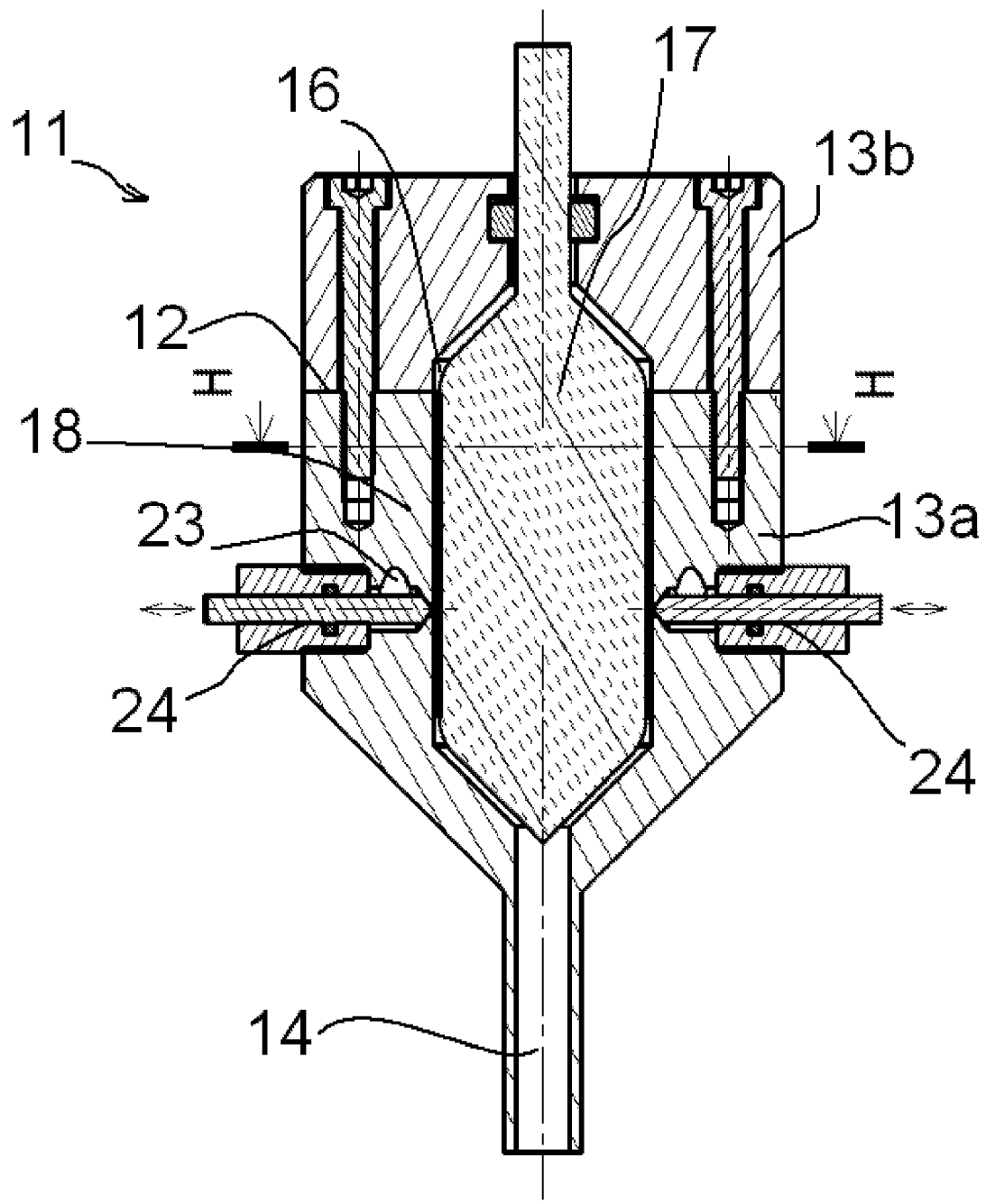
FIG. 2 shows the subject matter of FIG. 1 in a vertical section.

Referring now to the drawings wherein the showings are for the purpose of illustrating preferred and alternative embodiments of the invention only and not for the purpose of limiting the same, FIG. 1 shows a device, denoted overall by 10, for producing a multicomponent mixture, in particular a mixture of two polymer components chemically reacting with one another, for producing a foaming polymer mixture, which can for example be applied directly to a component (not shown) to produce a seal.

For this purpose, the device 10 primarily includes a mixing head 11, which can for example be handled by a robot and has a two-part housing 13, which is divided along a horizontal parting plane 12, the lower housing part 13a being closed on top by a covering 13b and having an outlet 14 and also two component valves 15, through which components to be mixed are introduced into a mixing chamber 16 formed in the interior of the housing 13. In the mixing chamber 16, the (polymer) components are mixed with one another by means of a rotatably driven mixing member 17, the mixing member being accommodated in the mixing chamber in an axially adjustable manner and it being possible in this way for the outlet 14 to be exposed or closed, as is known.

The mixing chamber 16 is surrounded all around by a chamber wall 18 of the housing 13, which has a temperature control channel system 19 through which water can flow in order to control the temperature of the mixing head 11, and consequently of the component mixture mixed in the mixing chamber, in particular to cool it. This temperature control channel system 19 is formed substantially by water channels 21 milled in the upper end face 20 of the lower housing part 13a, four altogether, running in an arcuate form over an angle of approximately 45°, and water bores 22, drilled obliquely into the lower housing part 13a at an obtuse angle from the upper end faces thereof, two mutually adjacent water bores that branch off downward from adjacent water channels respectively being in connection with one another at their lower ends, as can best be seen in FIG. 4. For this purpose, the water bores respectively open with their ends that are remote from the upper end face of the lower housing part into a prechamber 23. On two mutually opposite sides of the housing 13, flushing valves 24 are arranged between the prechambers 23 formed there and the mixing chamber 16 in the form of needle valves, the opening of which allows a fluid connection to be established between the temperature control channel system 19 and the mixing chamber 16.

Figure 3:
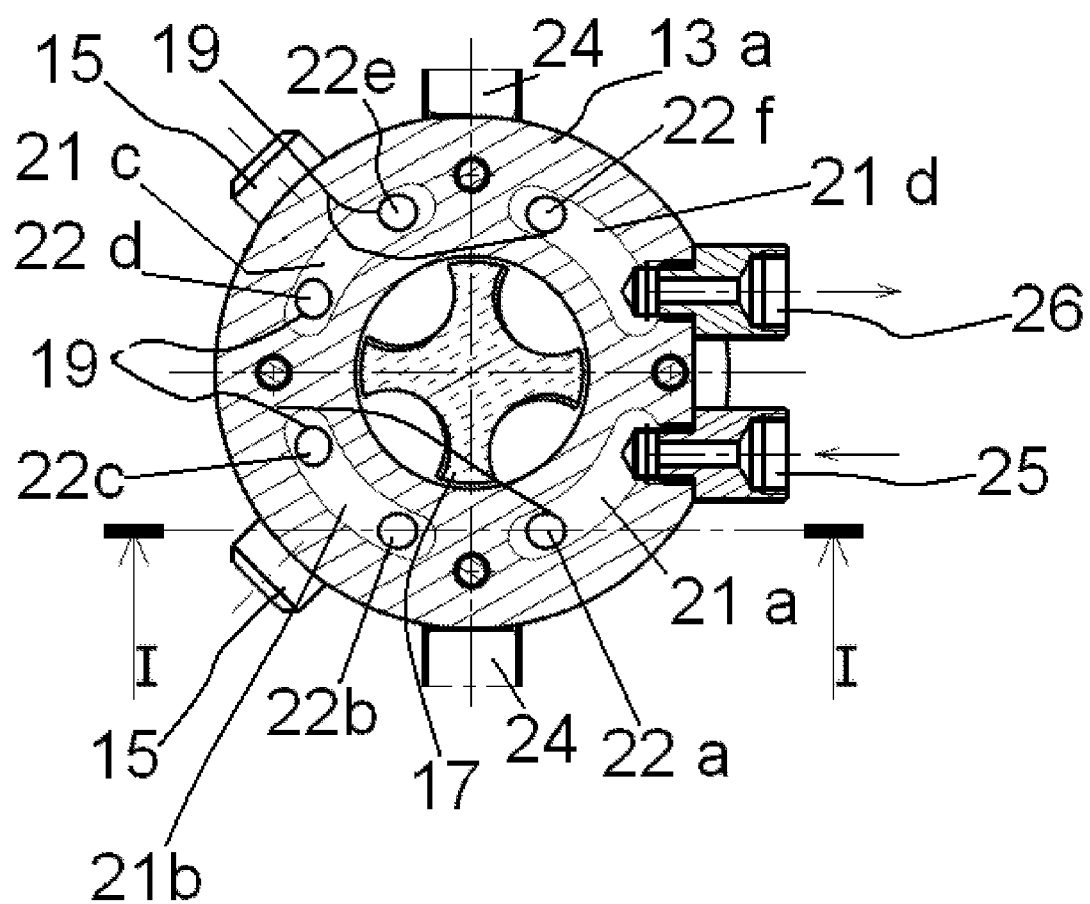
FIG. 3 shows the subject matter of FIGS. 1 and 2 in a horizontal section along the line H-H.
Figure 4:
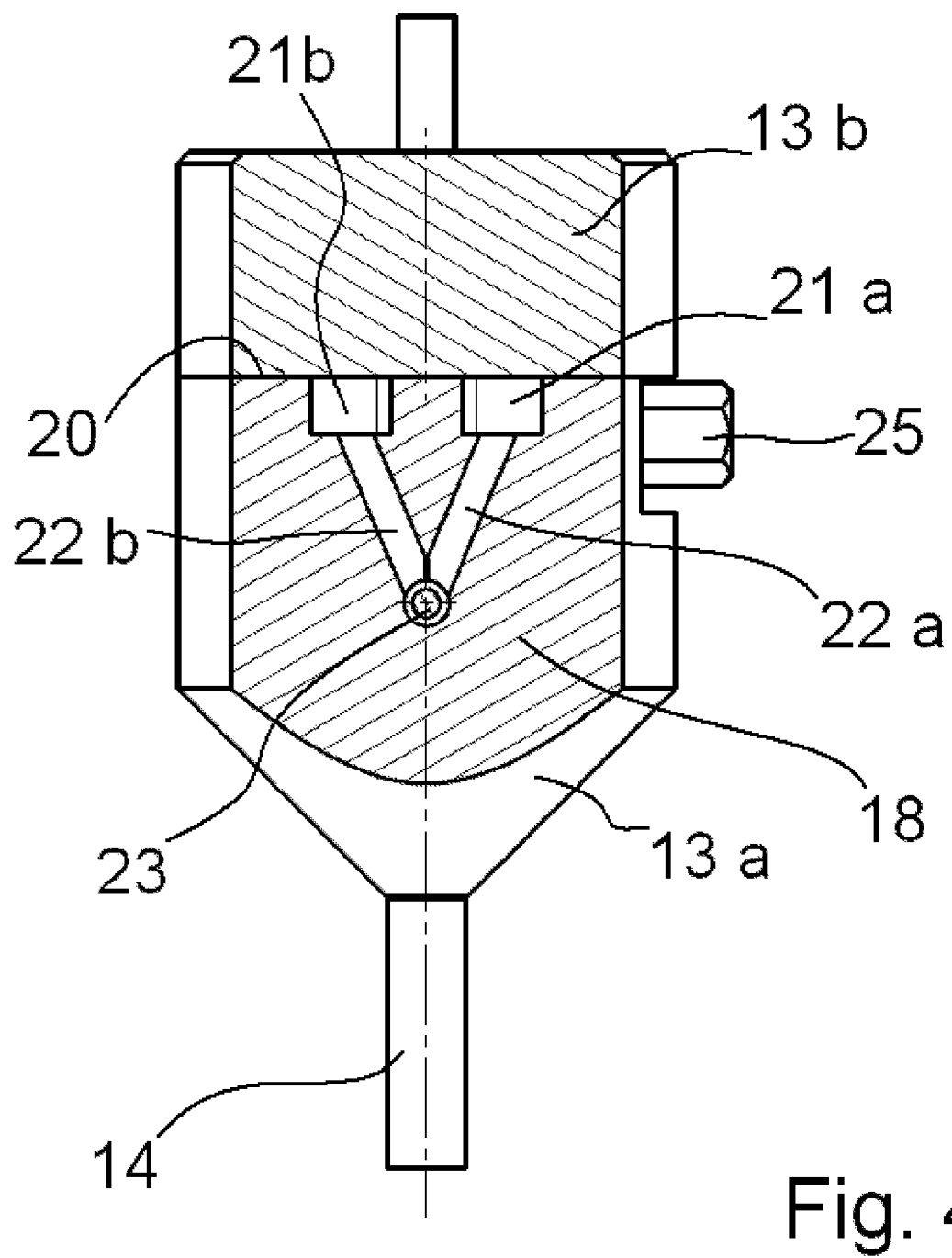
FIG. 4 shows the subject matter of FIG. 3 in a section along the line I-I.

As can be seen in particular from viewing FIGS. 3 and 4 together, it is possible, particularly for cooling the device, for the temperature control channel system to be flowed through by water, which initially enters a first water channel 21a, by way of an inflow connection 25 arranged at the upper housing rim of the lower housing part 13a, and from this water channel passes into a first water bore 22a, in order to pass through the latter downward into a first of the prechambers 23, from which one of the two flushing valves 24 branches off toward the mixing chamber 16. In normal temperature-controlling mode, the water flows from this first prechamber 23 upward again through the next water bore 22b and enters the second water channel 21b, at the other end of which it again undergoes a deflection downward into the water bore 22c, from the lower end of which it then flows upward again through the water bore 22d and, at the end of the adjoining third water channel 22c, it again flows downward through the bore 22e into the next prechamber 23, from which the second flushing valve 24, which is indicated in FIG. 4, branches off toward the mixing chamber. From there, the water once again flows upward through a last water bore 22f and passes into the last of the four water channels 21d and from there into an outflow connection 26.

Figure 5:
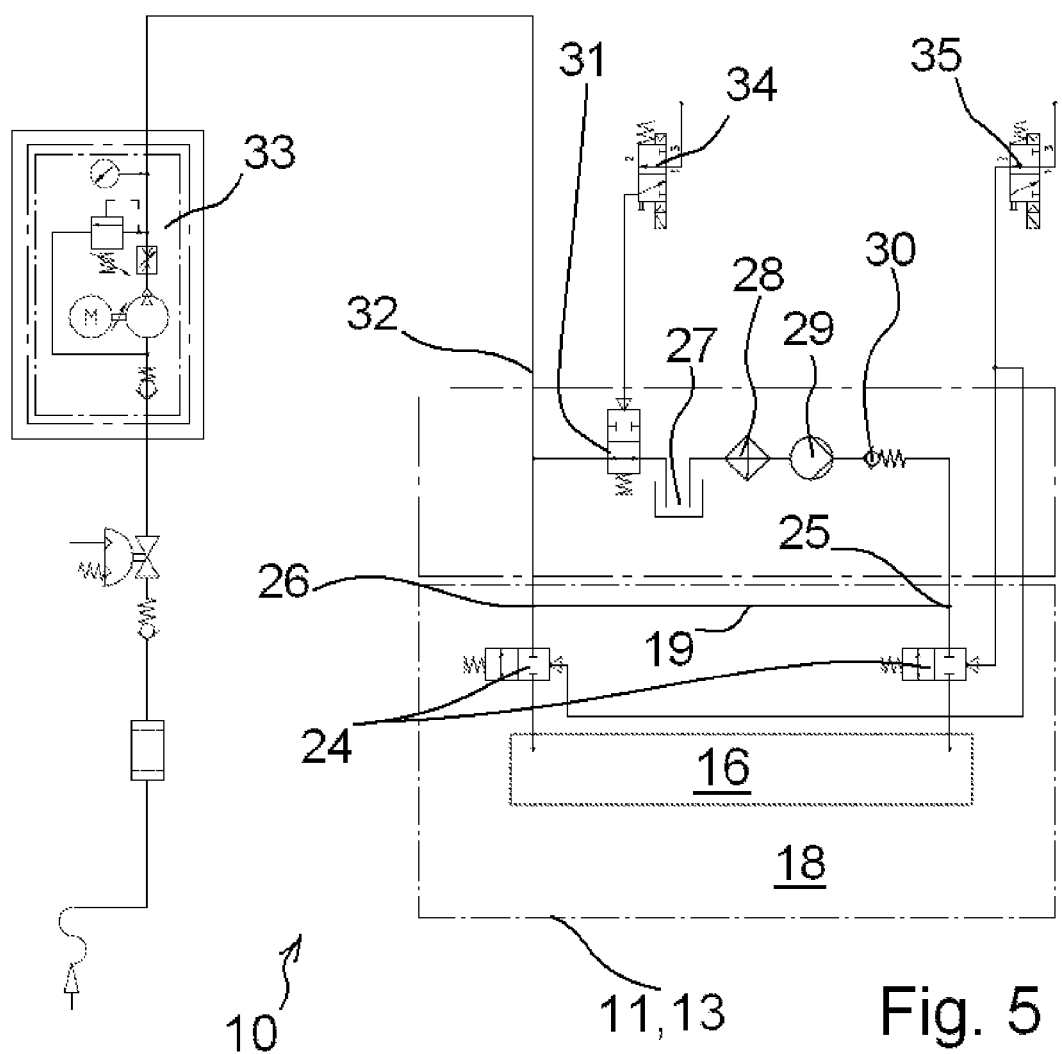
FIG. 5 shows a flow diagram to illustrate the cooling and backflushing circuit through the device of FIGS. 1 to 4.

The water circuit is presented in more detail in FIG. 5. It can be seen that the cooling water serving for controlling the temperature of the mixing head, in particular cooling it, is taken from a water collecting tank 27, then initially runs through a cooler 28, in which it is cooled, before it then passes from a circulating pump 29 by way of a check valve 30 to the inflow connection 25, in order subsequently, as described above, to flow through the temperature control channel system 19 in the mixing head 11. Provided in the cooling water circuit downstream of the outflow connection 26 is a switchable shut-off valve 31, which in cooling mode is open and in this state is flowed through by the cooling water coming from the outflow connection 26, before it returns into the water collecting tank 27.

Flange-mounted on the outflow connection 26, by way of a T piece connected between the latter and the shut-off valve 31, is a high-pressure water line 32, by way of which flushing water made available by a high-pressure pump unit 33 can be supplied for cleaning the mixing chamber 16 and the stirring member 17 arranged therein. For the backflushing, initially the shut-off valve 31 is actuated by way of a precontrol valve 34 by means of compressed air, in order to interrupt the cooling water circuit between the outflow connection 26 and the water collecting tank 27. While the high-pressure pump unit 33 keeps the flushing water intended for the cleaning of the mixing chamber available at the desired high pressure at the outflow connection, and consequently in fact substantially in the entire temperature control channel system 19 up to the check valve 30, the two flushing valves 24 are opened by a second precontrol valve 35 by means of compressed air, so that the flushing water under high pressure in the temperature control channel system is injected through the flushing valves 24 into the mixing chamber. The flushing water thereby impinges on the stirring element in the mixing chamber and the mixing chamber wall at very high speed and peels off the contaminants in the form of already reacted-out or partially reacted-out polymer mixture from the stirring element and the mixing chamber wall. The contaminated flushing water can then leave through the outlet 14, which is open during the flushing operation, and is subsequently collected and cleaned in a known way. Flushing water that is under high pressure is automatically prevented from escaping through the inflow connection by the check valve 30, which prevents water from flowing back through the circulating pump and the cooler.

When the flushing operation is ended by switching off the high-pressure pump unit 33, the flushing valves are kept open for a brief moment, in order that the residual pressure in the high-pressure water line can fall. After closing the flushing valves 24, the shut-off valve 31 between the outflow connection and the water collecting tank opens again, and the cooling water can be pumped again by the circulating pump through the temperature control channel system in order to keep the mixing head at the desired operating temperature.

It is evident that, just with a water channel system in the chamber wall 18 of the mixing head 11 surrounding the mixing chamber 16, the invention has succeeded not only in providing the desired temperature control of the device but also in ensuring high-pressure water flushing for cleaning the mixing chamber and the stirring member accommodated therein in a particularly space-saving and effective way.

The invention is not restricted to the exemplary embodiments presented and described, but instead various modifications or additions are conceivable without departing from the scope of the invention. For example, some other type of water conduction for the cooling water is conceivable, for example in that the mixing head is divided twice horizontally and has a middle part, which preferably extends over the height of the mixing chamber and in which water bores that run in the axial direction and at the top and bottom open into respectively shared distributing and collecting channels are arranged in the chamber wall. In the case of this embodiment, all of the water bores are then flowed through in the same direction, so that cooling water is always at substantially the same temperature over the entire circumference of the mixing head, and only heats up slightly on the comparatively short path through the water bores before it is drawn off again out of the mixing head and is transported to an external heat exchange. Instead of just two flushing valves, three or more flushing valves may also be used, these expediently being arranged such that they are distributed uniformly over the circumference of the mixing head.

Wherever the description of the invention refers to water (flushing water or cooling water), for the purposes of the invention this should be understood as not necessarily meaning pure water; instead, it is also possible that cleaning additives or other additives which, for example, reduce the surface tension of the water, improve the wetting and/or prevent any precipitation of lime/scale in the cooling channels and on the valves may be added to the water.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A device for producing a multicomponent mixture, the device comprising a mixing chamber which is surrounded by a chamber wall, the mixing chamber having an outlet for an associated multicomponent mixture, the device further including at least two component valves and at least one flushing valve in fluid connection with the mixing chamber, the at least one flushing valve having a flushing valve inlet and the flushing valve inlet being in fluid connection with a temperature control channel system which is associated with the chamber wall and through which an associated water can flow.

2. The device as claimed in claim 1, wherein the temperature control channel system is formed in the chamber wall.

3. The device as claimed in claim 1, wherein the temperature control channel system has a high-pressure water connection.

4. The device as claimed in claim 1, wherein the temperature control channel system has at least one inflow connection and at least one outflow connection for an associated cooling or heating water.

5. The device as claimed in claim 4, wherein at least one of the at least one inflow connection and the at least one outflow connection is in selective fluid connection with the high-pressure water connection.

6. The device as claimed in claim 4, wherein at least one of the at least one inflow connection and the at least one outflow connection is separable from the high-pressure water connection by at least one valve.

7. The device as claimed in claim 6, wherein the at least one valve includes at least one of a check valve and a shut-off valve.

8. The device as claimed in claim 1, wherein the at least one openable flushing valve is configured as a needle.

9. The device as claimed in claim 8, wherein the needle valve is actuatable by compressed air.

10. The device as claimed in claim 1, wherein the temperature control channel system has a plurality of channels which are arranged in the chamber wall, the chamber wall having a top and a bottom and the plurality of channels being distributed about the circumference of the mixing chamber and extending through the wall from at least one of the top downward and the bottom upward.

11. The device as claimed in claim 1, wherein the chamber wall has an end face covered by a covering, at least one water channel being formed in at least one of the end face and the covering, the at least one water channel extends about at least a portion of the circumference of the mixing chamber, the device further including water bores in the chamber wall connecting at least one pair of water channels.

12. The device as claimed in claim 11, wherein the water bores run in the chamber wall at an angle in relation to the end face, the water bores including a first water bore and a second water bore adjacent the first water bore, the pair of water channels including a first water channel and a second water channel, the first water bore extending from the first water channel to a first distal end and the second water bore extending from the second water channel to a second distal end, the first and second distal ends being in fluid connection with one another.

13. The device as claimed in claim 12, wherein the angle is an obtuse angle.

14. The device as claimed in claim 12, wherein the water bores further include a third water bore and a fourth water bore adjacent the third water bore, the pair of water channels being a first pair of water channels and the device further including a second pair of water channels, the second pair of water channels including a third water channel and a fourth water channel, the third water bore extending from the third water channel to a third distal end and the fourth water bore extending from the fourth water channel to a fourth distal end, the third and fourth distal ends being in fluid connection with one another.

15. The device as claimed in claim 14, further including at least a third pair of water channels.

16. The device as claimed in claim 12, wherein the first and second distal ends are in fluid connection with at least one prechamber and the at least one prechamber is in fluid connection with the flushing valve inlet on at least one of the at least one openable flushing valve.

17. The device as claimed in claim 16, wherein the at least one prechamber is a first prechamber and the at least one openable flushing valves is a first openable flushing valve, the device further including a second prechamber and a second openable flushing valve, the water bores further including a third water bore and a fourth water bore adjacent the third water bore, the pair of water channels being a first pair of water channels and the device further including a second pair of water channels, the second pair of water channels including a third water channel and a fourth water channel, the third water bore extending from the third water channel to a third distal end and the fourth water bore extending from the fourth water channel to a fourth distal end, the third and fourth distal ends being in fluid connection with one another, the third and fourth distal ends being in fluid connection with the second prechamber.

18. The device as claimed in claim 1, wherein the associated water flowing through the temperature control channel system circulates in a circuit, the circuit having a storage tank, a heating or cooling device and a circulating pump for the associated water.

19. The device as claimed in claim 18, wherein at least one of a switchable shut-off valve and a check valve is arranged in the circuit.

20. The device as claimed in claim 18, wherein the at least two component valves and that at least one flushing valve are in selective fluid connection with the mixing chamber.

* * * * *